April 14, 1953 — M. E. RAPPAPORT — 2,635,012
VEHICLE WHEEL
Filed Nov. 21, 1947
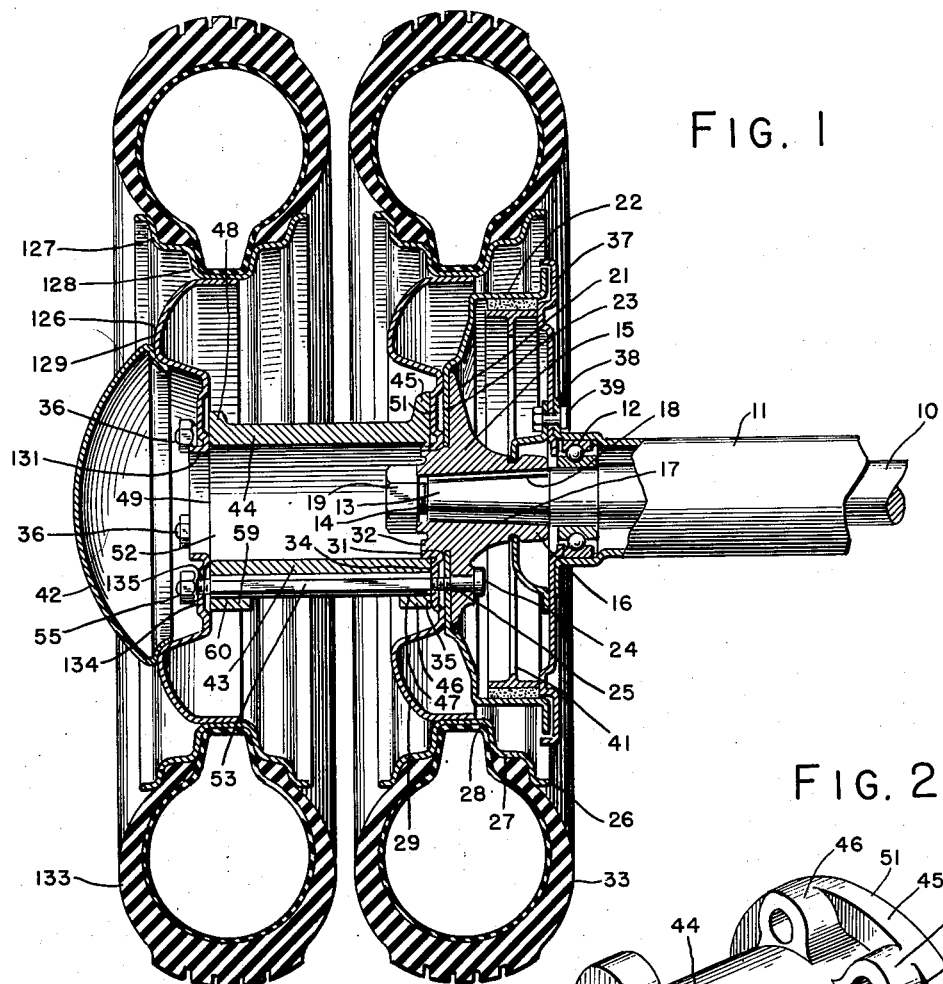
FIG. 1
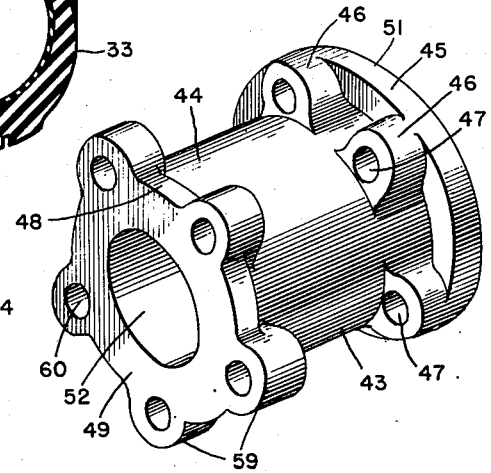
FIG. 2
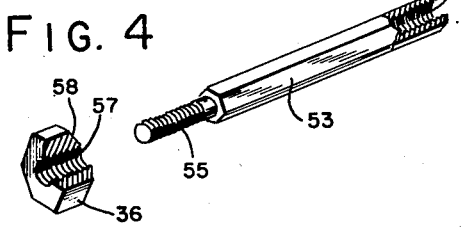
FIG. 3
FIG. 4
INVENTOR
MAX E. RAPPAPORT
BY Caswell & Lagaard
ATTORNEYS

Patented Apr. 14, 1953

2,635,012

UNITED STATES PATENT OFFICE 2,635,012

VEHICLE WHEEL

Max E. Rappaport, Minneapolis, Minn.

Application November 21, 1947, Serial No. 787,305

3 Claims. (Cl. 301—36)

My invention relates to vehicle wheels and has for an object to provide a construction by means of which a vehicle having a single driving wheel may be easily converted into a vehicle having dual driving wheels.

An object of the invention resides in providing a construction by means of which a supplemental wheel may be attached to an existing driving wheel without reconstruction or alteration of the existing driving wheel.

A still further object of the invention resides in providing a construction whereby the supplemental wheel is rigidly and securely mounted with reference to the driving wheel.

Another object of the invention resides in providing a spacer disposed between the wheels and in further utilizing tie members extending between the wheels and simultaneously drawing the wheels and spacer together.

A still further object of the invention resides in providing a construction whereby the supplemental wheel may be attached to the driving wheel by means of the studs and nuts used for mounting the driving wheel.

Other objects of the invention reside in the novel combination and arrangement of parts and in the details of construction hereinafter illustrated and/or described.

In the drawings:

Fig. 1 is an elevational sectional view of the driving wheel and supporting structure therefore of a motor vehicle and illustrating an embodiment of my invention applied thereto.

Fig. 2 is a perspective view of the spacer used with the invention.

Fig. 3 is a perspective view of one of the tie members used with the invention.

Fig. 4 is a perspective view of one of the nuts used in conjunction with the tie member illustrated in Fig. 3.

For the purpose of illustrating the application of my invention I have shown a portion of the rear axle 10 of a motor vehicle. This axle is mounted in a tubular axle housing 11 and is supported for rotation therein by means of a ball bearing 12 mounted at the outer end of the said housing. The end of the axle 10 is tapered in form as indicated at 13 and is threaded at its extremity 14 to receive a nut 19. Mounted on the tapered end 13 of axle 10 is a wheel support 15 which has a hub 16 bored as indicated at 17 to receive the tapered end 13 of the axle 10. A key 18 holds the wheel support 15 from rotation and the nut 19 holds the said support in place upon the axle. The wheel support 15 is formed with a flange 21 which has mounted on it a brake drum 22. This drum has a web 23 which overlies the flange 21. A number of studs 24 are mounted in the flange 21 being secured therein by means of a pressed fit and are formed with threaded ends 25. The ends 25 of said studs project outwardly beyond the web 23 and are used for attaching the wheel of the vehicle to the wheel support 15. Cooperating with the brake drum 22 is a mud guard 37 which is attached to a flange 38 formed at the extreme end of the housing 11. Bolts 39 extend through the said flange and guard and hold the same attached to the housing. Within the interior of the drum 22 is provided brake mechanism 41 which functions in the usual manner.

The driving wheel of the vehicle is designated at 26 in Fig. 1 and comprises a rim 27 having a drop center 28. This rim has attached to the drop center 28 thereof a wheel center 29 which is provided with a short bushing 31 adapted to fit over a cylindrical hub 32 formed on the end of the wheel support 15. By means of this construction the wheel 26 is centered relative to the axle 10. Mounted on the rim 26 is a tire 33 of ordinary construction. The wheel center 29 has a web 34 which overlies the web 23 of the brake drum 22. This web is constructed with holes 35 through which the ends of the studs 34 extend. Nuts 36 such as shown in Fig. 4 are ordinarily screwed on the ends of the said studs and clamp the wheel in position.

The invention contemplates using in conjunction with the driving wheel 26 a supplemental wheel 126 which is attached to the wheel 26. This wheel is identical in construction with the wheel 26 and the description thereof will not be repeated and the same reference numerals preceded by the digit 1 which will be used to designate the corresponding parts. It will be noted, however, that a hub cap 42 may be applied to this wheel in the customary manner.

For the purpose of attaching the wheel 126 to the wheel 26 a spacer 43 is employed. This spacer is best shown in Fig. 2 and consists of a tubular portion 44 having a flange 45 projecting outwardly therefrom at one end. The said tubular portion has a number of longitudinally extending bosses 46 disposed adjacent said flange and integral therewith. These bosses are distributed about the periphery of the flange 45 and correspond in number and position to the studs 24 on the wheel support 15. The bosses 46 have bores 47 extending therethrough which register with said studs. The spacer 43 also has a flange indicated at 48 of a lesser radial extent than the flange 45 and issuing outwardly from the tubular portion 44 at the end thereof opposite the flange 45. On the tubular portion 44 are formed a number of bosses 59 which are integral with the flange 48. These bosses correspond with the bosses 46 and have bores 60 extending therethrough and which are in alignment with the bores 47. The flange 45 has a face 51 which merges with the ends of the bosses 46 while the flange 48 has a similar face 49 facing in the opposite direction and which merges with the ends of the bosses 48. The tubular member 44 is constructed with a central cavity 52 which reduces the weight of the spacer and which receives the nut 19 on the end of the axle 10. This cavity has an internal diameter such that the same snugly fits upon the outer surface of the bushing 31 on the wheel center 29. Thus, the stress from the supplemental wheel is directly transmitted through the spacer 43 and to the wheel support 15.

For securing the parts together a number of tie members, one of which is indicated at 53 in Fig. 3 is employed. This tie member is constructed from a hexagonal rod. One end of the said rod is drilled and formed with a tapped hole 54 while the other end is formed with a threaded stud 55 extending outwardly therefrom. The end of the tie member adjacent the hole 54 is provided with a bevel 56. The nut 36 is similar to ordinary nuts used for attaching wheels in motor vehicles being constructed from hexagonal stock and having a threaded hole 57 extending through the same. The end of said nut is formed with a bevel 58 best shown in Fig. 4. This nut is adapted to screw upon either the stud 55 or the stud 24.

In the use of the invention the following is the procedure. The nuts 36 are normally applied to the studs 24 to hold the wheel 26 in position when only the wheel 26 is used. When the supplemental wheel 126 is to be applied the nuts 36 are first removed one at a time and the tie members 53 applied to the said studs by screwing the threaded holes 54 on the threaded ends 25 of said studs. The wheel 26 then becomes supported by said tie members instead of the nuts 36. The bores 47 and 60 in the spacer 43 are of dimensions such that the said spacer may be applied to said tie members by placing the bores of said spacer in register with the time members, and by sliding the said spacer along said tie members toward the wheel 26. When so applied the parts are arranged as illustrated in Fig. 1 with the studs 25 projecting outwardly beyond the face 49 of the spacer 43 and with the face 51 of said spacer engaging the web 34 of the wheel center 29. The supplemental wheel 126 is next applied to the studs 55 in the same manner as the wheel 26 was applied to the studs 24. Nuts 36 are next screwed upon the stud 25 and the wheel 126 becomes rigidly attached to the wheel 26. It will be noted that the time members 53 draw the spacer 43 into engagement with wheel 26 and at the same time draw the wheel 126 into engagement with the said spacer. In this manner the parts are rigidly secured together and the same pressure caused to exist between both wheels and the spacer. After replacement of the hub cap 42 the dual wheels are ready for use.

If desired, the first wheel may be omitted and the tie members 53 directly applied to the studs 24. The spacer 43 is then applied to the tie members and the wheel 126 mounted as previously described. The invention then utilizes merely the wheels furnished with the vehicle and serves to extend the tread of the wheels, to bring narrow gage vehicles up to standard gage.

The advantages of the invention are manifest. The supplemental wheel can be attached to the existing wheel without the existing wheel being removed or the wheel construction of the vehicle having to be modified or changed. The studs used for attaching the usual driving wheel to the wheel support are also used to attach the supplemental wheel. By the use of the spacer great rigidity exists between the two wheels and the supplemental wheel will assume its portion of the load without movement relative to the driving wheel and without undue strain on the parts. With my invention the load from the supplemental wheel is primarily transmitted through the spacer thereby relieving to a great extent the stress on the tie members. In my invention the tie members simultaneously urge the spacer into engagement with the driving wheel and the supplemental wheel thereby equalizing the forces in the same and preventing variation in stress in the supporting structure. The supplemental wheel used with my invention may be readily attached to the existing wheel and without the use of special tools or equipment. A vehicle equipped with wheels embodying the instant invention becomes highly serviceable for the carrying of additional loads and has the safety feature incident to dual wheels of supporting the load in the event of puncture of one of the tires. By omission of the innermost wheels the invention functions to extend the tread of the wheels and to increase the gage of the vehicle.

Changes in the specific form of my invention, as herein described, may be made within the scope of what is claimed without departing from the spirit of my invention.

Having described my invention, what I claim as new and desire to protect by Letters Patent is:

1. In combination, a wheel support, studs issuing outwardly therefrom, a wheel mounted on said wheel support, threaded rods screwed on said studs and extending outwardly therefrom, said rods clamping said wheel against said support, a spacer mounted on said rods, said spacer comprising a flange seated against said wheel and a tubular portion connected thereto, bosses formed on said tubular portion, said flange and bosses having registering openings therein and through which said rods extend, said openings being disposed outwardly from said tubular portions to expose parts of said rods, wrench engaging means formed on said rods and exposed between said flange and bosses, said spacer forming a second wheel support, a second wheel mounted on said second wheel support, and threaded means engaging said second wheel and acting with said rods to hold said second wheel attached to said second support.

2. In combination, a wheel support, studs issuing outwardly therefrom and arranged in circular formation, a wheel mounted on said wheel support and having openings through which said studs extend, a number of tie-members each having a hexagonal body portion of uniform configuration throughout its length tapped at one end to screw on said studs, studs issuing outwardly from the other ends of said body portions, a spacer having a tubular portion received within said rods and having one end adapted to engage said wheel, projections extending radially outwardly from said tubular portion at the ends of the same and having registering holes therein through which said rods extend and in which the rods are rotatable, said holes being disposed outwardly from said tubular portion to expose parts of said hexagonal body portions intermediate said projections to facilitate turning said tie-members after the spacer has been applied to the same, said spacer forming a second wheel support, a second wheel mounted on said second wheel support, and threaded means engaging said second wheel and acting with said rods to hold said second wheel attached to said second support.

3. In combination a wheel support, studs issuing outwardly therefrom and arranged in circular formation, a wheel having a wheel center formed with inner and outer surfaces and being provided with openings, said wheel being applied to said support with said inner surface engaging the wheel support and with said studs extending through said openings, a number of tie-members each having a hexagonal body portion of uniform configuration throughout its length tapped at one end to screw on said studs and adapted to engage said wheel center at its outer surface, said body portions of said tie-members having studs issuing outwardly from the other ends thereof, a spacer having a tubular portion received within said tie-members and having one end adapted to engage the outer surface of said wheel center, projections extending radially outwardly from said tubular portion at the ends of the same and having registering holes therein through which said tie-members extend and in which the tie-members are rotatable, said holes being disposed outwardly from said tubular portion to expose parts of said hexagonal body portions intermediate said projections to facilitate turning said tie-members after the spacer has been applied to the same, the outer end of said spacer forming a second wheel support, a second wheel identical with said first wheel and mounted on said second support with the inner surface of its wheel center engaging said second wheel support and with the studs on said tie-members extending through the openings in its wheel center, said spacer being of a length equal to the distance between the medial planes of said wheels, and nuts screwed on the ends of the studs issuing from said tie-members and engaging the outer surface of the wheel center of said second wheel.

MAX E. RAPPAPORT.

References Cited in the file of this patent

UNITED STATES PATENTS

| Number | Name | Date |
| --- | --- | --- |
| 1,297,243 | Putnam | Mar. 11, 1919 |
| 1,428,556 | Putnam | Sept. 12, 1922 |
| 1,904,081 | Pratt | Apr. 18, 1933 |

FOREIGN PATENTS

| Number | Country | Date |
| --- | --- | --- |
| 471,293 | Germany | Feb. 11, 1929 |